Patented June 5, 1923.

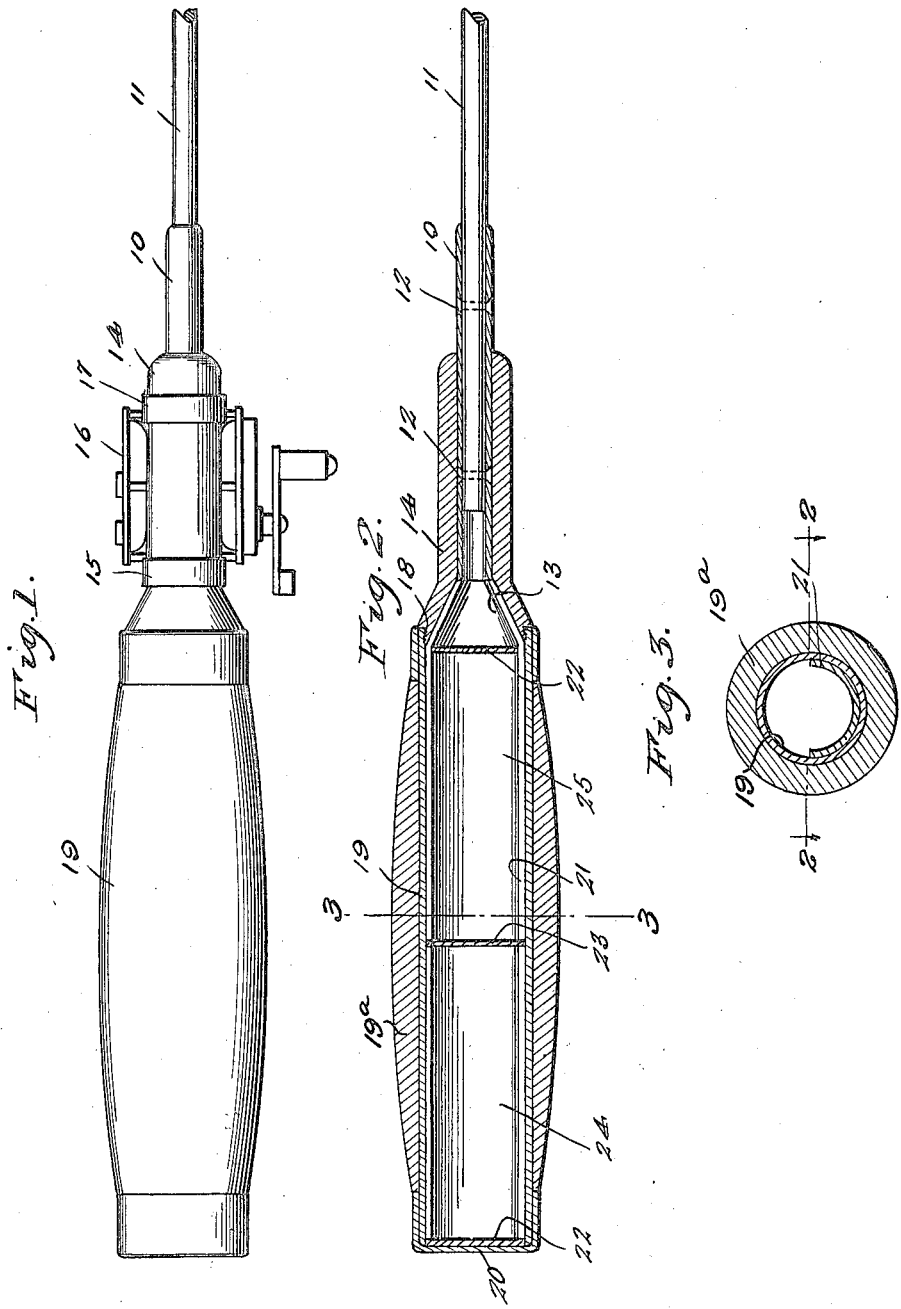

1,458,057

UNITED STATES PATENT OFFICE.

WILLOUGHBY F. HOLLISTER, OF COWEN, WEST VIRGINIA.

FISHING ROD.

Application filed January 16, 1922. Serial No. 529,637.

*To all whom it may concern:*

Be it known that I, WILLOUGHBY F. HOLLISTER, a citizen of the United States, residing at Cowen, in the county of Webster and State of West Virginia, have invented new and useful Improvements in Fishing Rods, of which the following is a specification.

This invention relates to sporting goods, particularly to fishing rods, and has for its object the provision of a novel fishing rod butt or handle which is provided internally with a receptacle within which may be stored hooks, flies, sinkers, or the like for convenience and accessibility, the outer portion of the handle being removable to gain access to this receptacle.

An important object is the provision of a butt of this character in which the parts are easily disconnected when desired, the device having the great advantage of carrying the sporting equipment at the most logical place and eliminating all necessity for fumbling in a box or the like when searching for an extra hook or other accessory.

An additional object is the provision of a device of this character which will be simple and inexpensive in construction, highly efficient in use, durable in service, and a general improvement in the art.

With the above and other objects and advantages in view, the invention consists in the details of construction to be hereinafter more fully described and claimed and illustrated in the accompanying drawings in which Figure 1 is a side elevation of a fishing rod butt constructed in accordance with my invention.

Figure 2 is a longitudinal sectional view therethrough on the line 2—2 of Figure 3.

Figure 3 is a cross sectional view on the line 3—3 of Figure 2.

Referring more particularly to the drawings, I have shown my device as comprising an elongated tube 10 within which is disposed the fishing rod proper, a portion of which is indicated at 11, the rod being secured by means of suitable rivets 12 or the like. Engaged and suitably secured upon the lower portion of the tube is a sleeve 14 which conforms in shape to the tube and which carries the usual fixed ring 15 serving to hold one end of the reel, indicated at 16. Slidable upon this sleeve is the usual slip ring 17 for holding the other end of the reel. The free or rear end of the sleeve 14 is flared, with its edge somewhat reduced, as shown at 18, and externally threaded.

The numeral 19 designates a handle or grip which may be covered with cork 19ª, corrugated fibre or any other material commonly used for this purpose and this handle has one end closed, by a cap 20, and its other end open and internally threaded for screwing engagement upon the reduced extension 18. Located within this handle is a semi-cylindrical receptacle 21 having circular ends 22 and a circular central partition 23 defining separate compartments 24 and 25. The forward end of the member 21 is conical or tapered as shown at 13 and fits within the flared rear end of the tube 14.

Assuming that the device is constructed and assembled as above described and as illustrated in the drawings, it will be seen that the compartments 24 and 25 provide ample storage space for extra hooks, flies, sinkers and other equipment and will carry these accessories always in association with the rod. Whenever it is desired to gain access to these compartments it is merely necessary to unscrew the handle 19 whereupon access may be had to the articles desired, after which the handle is merely screwed back into place so as to form a closure for the receptacle or to prevent loss or displacement of the articles therein.

From the foregoing description and a study of the drawings it will be apparent that I have thus provided a very simple and consequently inexpensive butt construction for fishing rods which will be very handy in use and which will not only operate to save time and labor when reaching for supplies but which will also prevent loss of the various articles necessary to a fisherman's equipment.

While I have shown and described the preferred embodiment of my invention, it is of course to be understood that I reserve the right to make such changes in the form, construction and arrangement of parts as will not depart from the spirit of the invention or the scope of the subjoined claims.

What is claimed is:—

1. A fishing rod butt comprising an elongated tube serving as a socket within which the larger end of a rod is secured, a sleeve secured externally upon said tube and formed with a reel seat and a reel securing ring, a receptacle secured within and projecting beyond the open end of the sleeve and having one side open, and a handle having one end closed and the other end open and threaded and normally engaged upon the free end of the sleeve.

2. A fishing rod comprising an elongated tube constituting a socket, a rod proper permanently secured within said tube, the free end of said tube being flared, a sleeve secured externally upon and conforming in shape to said tube and the flared end thereof and carrying reel holding means, the free end of said sleeve being formed with a reduced externally threaded extension, a semi-cylindrical receptacle secured to and projecting beyond the open end of the sleeve and having circular ends and a circular partition defining separate compartments, and a handle engaged exteriorly upon the receptacle and having one end closed and its other end internally threaded for screwing engagement upon the threaded extension of the sleeve.

In testimony whereof I affix my signature.

WILLOUGHBY F. HOLLISTER.